March 24, 1959   A. W. HENDEE   2,879,097
FASTENER FOR BOXES AND THE LIKE
Filed June 20, 1956
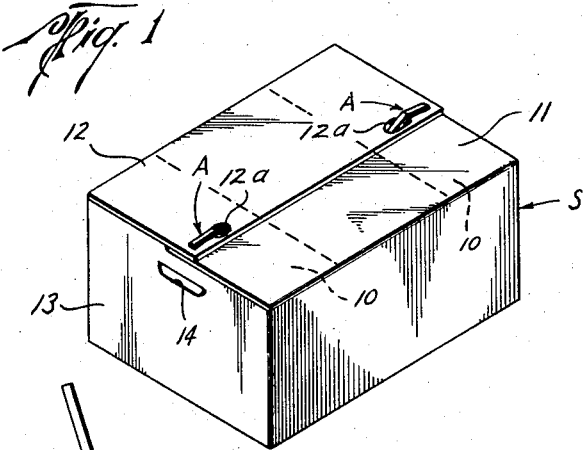
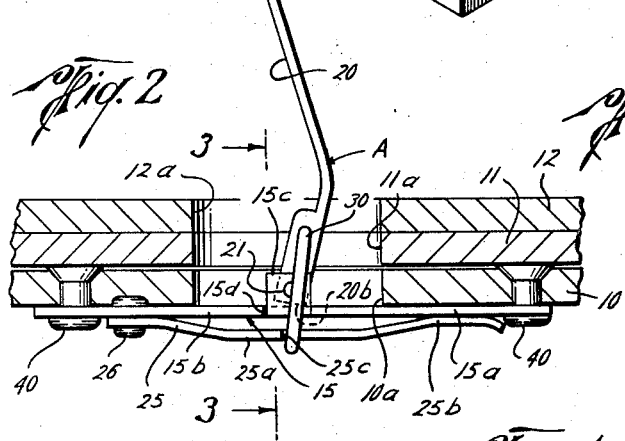
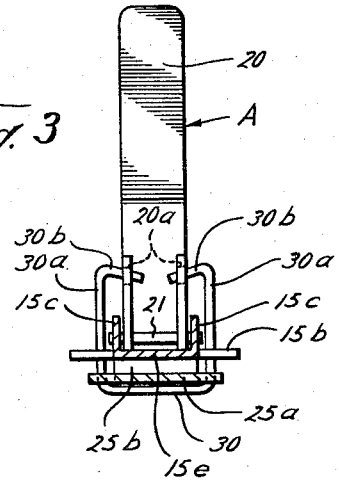
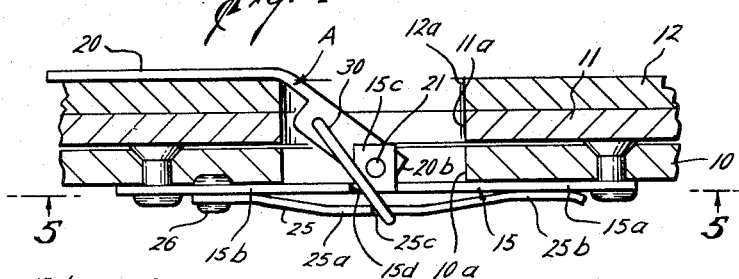
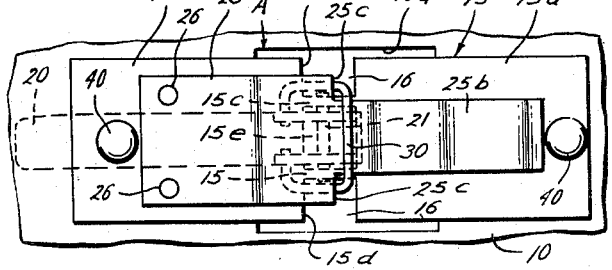
Alfred W. Hendee
INVENTOR.
BY Hayden & Pravel
ATTORNEYS

United States Patent Office 2,879,097
Patented Mar. 24, 1959

2,879,097

FASTENER FOR BOXES AND THE LIKE

Alfred W. Hendee, Bellaire, Tex.

Application June 20, 1956, Serial No. 592,607

14 Claims. (Cl. 292—256)

This invention relates to fasteners for storage file boxes and the like.

An object of this invention is to provide a new and improved fastener which is particularly adapted for use with storage file boxes and the like so that such file boxes can be more quickly and easily opened and closed than with the prior known constructions.

An important object of this invention is to provide a fastener for storage file boxes and the like which is compact in size and is economical to manufacture, and which is adapted to be attached to one flap of a storage file box and is adapted to clamp such flap to an adjacent overlying flap or flaps to retain such flaps against opening until desired; such fastener being readily moved to an open position to permit the opening of the flaps for access to the inside of the box.

Another object of this invention is to provide a new and improved fastener for storage file boxes and the like which is so constructed that it does not interfere with the provision of hand openings on the sides of the box so that the boxes with the fasteners can be more readily handled.

A further object of this invention is to provide a fastener for storage file boxes and the like which is adapted to fasten the top flaps of such boxes in a closed position without protruding above the upper level of the top flaps sufficiently to interfere with the stacking of a plurality of such boxes, one on top of each other, and without extending inwardly into each box sufficiently to interfere with the material in the box.

A still further object of this invention is to provide a new and improved fastener for storage file boxes and the like wherein a flat spring is utilized for maintaining the fastener in a closed position and for also holding the fastener in an open position, while requiring only a slight deflection of the spring, whereby spring fatigue is maintained at a minimum and a longer life for the fastener is obtained.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

Fig. 1 is an isometric view illustrating the fastener of this invention located at each end of a storage file box for holding the flaps thereof in a closed position.

Fig. 2 is a view, partly in elevation and partly in section, illustrating the fastener of this invention in detail.

Fig. 3 is an elevation taken on line 3—3 of Fig. 2 to illustrate the fastener of this invention.

Fig. 4 is a view similar to Fig. 2, but illustrating the fastener in the closed position for holding the flaps of the storage file box closed.

Fig. 5 is a view taken on line 5—5 of Fig. 4 and particularly illustrating the lower side of the fastener of this invention.

In the drawings, the letter A designates generally the fastener of this invention. Ordinarily, two of such fasteners A are mounted with a storage file box S on the inside flaps 10 for holding the top or upper flaps 11 and 12 thereof in a closed position, and for permitting the opening thereof for access into the interior of the box S when desired. As will be explained in detail, the fastener A of this invention is so constructed that it lies substantially flat when in the closed position so that it does not interfere with the stacking of a number of storage file boxes S on top of each other. Also, the fasteners A located on each storage box S are disposed away from the sides or ends 13 of the box S so that hand holes or openings 14 may be provided therein to facilitate the lifting and carrying of the box S. Other features and advantages of the fastener A will become evident from the detailed description hereinafter.

Considering the invention in detail, the fastener A of this invention includes a base 15 which is formed of two base sections 15a and 15b which are joined together by a connecting midportion 15e having pivot lugs 15c mounted thereon between the ends of the sections 15a and 15b. A notch 16 is provided between the ends of the base sections 15a and 15b on each side of the lugs 15c. A fastener arm or clamp 20 is pivotally connected to the pivot lugs 15c with a pivot pin or rod 21 which extends through suitable openings at the lower end of the locking arm 20 and in each of the lugs 15c. The locking arm or clamp 20 is so pivoted to the lugs 15c with the pivot pin 21 that it is adapted to extend upwardly through openings 10a, 11a, and 12a of the flaps 10, 11 and 12, respectively, when the fastener is in the open position, as will be explained in detail.

The base 15 has a leaf spring 25 connected thereto by rivets 26 at one end thereof, or by any other suitable attaching means. The leaf spring 25 is curved or bowed downwardly at its central portion 25a (Figs. 2–4) which is disposed below the pivot lugs 15c. The leaf spring 25 also has a reduced width portion 25b which is in contact with the lower surface of the base section 15a, but is unattached. Lateral shoulders 25c (Fig. 5) are provided on the spring 25 and are disposed below the pivot lugs 15c for a purpose to be hereinafter explained. A stirrup 30 which is approximately of a U shape has its lower portion positioned below the leaf spring 25 adjacent to the shoulders 25c. The upstanding legs 30a of the stirrup 30 extend upwardly through the notches 16 and the opening 10a and externally of the lugs 15c. The legs 30a of the stirrup 30 are turned downwardly and inwardly as indicated by the ear portions 30b which extend through openings 20a formed at the lower portion of the locking arm or clamp 20 (Fig. 3). When the ear portions 30b are inserted through the openings 20a, the stirrup 30 must be pulled upwardly to place the leaf spring 25 under compression so that after the stirrup 30 is mounted as shown in the drawings, with the downwardly extending portions 30b in the openings 20a, the spring 25 exerts a downward force on the stirrup 30 which in turn is transmitted to the locking arm or clamp 20, as will be explained. The amount of spring pressure which is applied to the arm 20 depends upon its position. Thus, when the arm 20 is in the locking or clamping position (Fig. 4), a minimum amount of downward force is applied to the clamping arm 20, but such amount is sufficient to hold the arm 20 in the locking position until manually moved to the open position. The maximum pressure is exerted on the clamping arm 20 as the stirrup 30 passes to either side of the pivot pin 21 so that the arm 20 is urged to either a closed or open position by the pressure of the spring 25. The forward movement of the clamping arm 20 to the closed position is limited by the contact of the arm 20 with the upper surface of the top flap 12, but a crushing force is not applied thereto because of the relatively large flat surface area of the lower surface of the arm 20 which engages the flap 12. In the event the flaps 11 and 12 are not in position above the inside flap 10, the arm 20 is then limited in its movement to a closing position by the engagement of the stirrup legs 30a with the forward wall 15d. When the arm 20 is moved to the closed position, the lower end of the stirrup 30 is limited in its movement by the engagement of the legs 30a with the shoulders 25c, as shown in Fig. 4. Also, the movement of the clamping arm 20 is stopped when it is returned to the open position (Figs. 2 and 3) by the contact of the lower surface or flat bottom 20b (Fig. 4) with the mid-portion 15e. By so limiting the movement of the clamping arm 20 to its open position, it extends substantially vertically in the open position for facilitating the lifting of the upper flaps 11 and 12 upwardly to open same without interference from the fastener A.

It should be noted that the fastener A of this invention can be utilized with other constructions, but as shown in the drawings, the base 15 is riveted to the lower side of the inside flap 10 with rivets 40 or other suitable attaching means.

The operation or use of the fastener A of this invention is believed evident from the foregoing description. Thus, a fastener A is mounted on each inside flap 10 so that the pivoted clamping arm 20 extends upwardly through the opening 10a in the flap 10. With the clamping arm 20 in the open position (Figs. 2 and 3), the upper flaps 11 and 12 are moved downwardly into position so that the openings 11a and 12a pass around the clamping arm 20 and they become aligned with the opening 10a so that the flaps 11 and 12 are overlapped and are positioned above the inside flaps 10 with the clamping arm 20 extending through the openings 10a, 11a and 12a. To close or fasten the fastener A, the clamping arm 20 is simply moved to the left (Fig. 2) so as to move the stirrup 30 past the pivot point 21, at which time the leaf spring pressure is about the maximum and a very rapid closing of the arm 20 by a downward movement to the left (Fig. 2) is effected. Such downward movement is stopped by the contact of the clamping arm 20 with the upper surface of the flap 12 so that it is held against separation from the lower flaps 10 and 11 but a crushing force thereto is not applied to the flaps as previously explained.

When it is desired to open the box S, the arm 20 is manually raised upwardly to the open position of Fig. 2 and then the flaps 11 and 12 can be again raised relative to the inside flaps 10. The bottom 20b serves as the stop to limit the movement of the clamping arm 20 to the right (Fig. 2) and such stop takes effect or contacts the base portion 15e after the stirrup 30 has moved to the right of the pivot pin 21 (Fig. 2) so that the clamping arm 20 is locked in an open position until it is manually moved to the left again for closing same.

It should be pointed out that the hand holes 14 are sometimes omitted to prevent the entry of rodents or insects, but where such conditions do not exist, the hand holes 14 facilitate lifting of the box S.

Also, although it is preferable to attach the fastener A to each inside flap 10, the fastener A may be attached to the lower one of the top flaps 11 if desired, so that the connection with the inside flap 10 is omitted. In such case, the fastener A would lock the flap 12 to the flap 11 in the closed position.

The foregoing disclosure and description of the invention is illustrative and explanatory thereof and various changes in size, shape and materials, as well as in the details of the illustrated construction, may be made within the scope of the appended claims without departing from the spirit of the invention.

What is claimed is:

1. A fastener for boxes and the like having overlapping flaps with aligned openings therein, comprising a clamping member, a base member connected to the lower one of said flaps, means pivotally connecting said clamping member to said base member with said clamping member extending through said aligned openings in said overlapping flaps, a spring mounted on said base member and spaced from said clamping member, and connector means extending from said spring to said clamping member for transmitting the spring force to said clamping member to urge same to a locked position in engagement with the upper one of said flaps to prevent the separation of said flaps until said clamping arm is moved out of contact with said upper one of said flaps.

2. The structure set forth in claim 1, including means on said base member to stop the movement of said connector means to thereby limit the amount of the spring force applied to the upper one of the flaps by said clamping member, whereby crushing of the upper flap is prevented even though it is engaged in the locking position.

3. The structure set forth in claim 1, wherein said spring is a leaf spring positioned below said base member, and including means connecting only one end of said spring to said base member, the other end of said spring being unattached but having contact with the lower surface of said base member whereby said spring is supported against upward movement but is permitted to flex relative to said base member.

4. A box having at least one fastener connected thereto for releasably fastening adjacent flaps of the box in an overlapped position, each of said flaps having an opening which is aligned with an opening in the other of the flaps when said flaps are in the closed position, said fastener comprising, a base member connected to the inner one of said flaps, a clamping member extending through the opening in the inner flap and also through the opening in the outer one of said flaps when same is in the closed position, a pivotal connection means for connecting said clamping member to said base member for pivoting of the clamping member from a locking position in engagement with the outer surface of the outer one of the flaps to an open position extending substantially vertically in the aligned openings in the flaps, a spring mounted on said base member and spaced from said clamping member, and connector means extending from said spring to said clamping member for applying a positive pressure to said clamping member in all positions thereof.

5. The structure set forth in claim 4, including coacting stop means on said base member and said connector means to limit the pivotal movement of said clamping member for limiting the amount of spring force applied to the outer of said flaps by said clamping member in the locking position whereby crushing of the outer flap is prevented even though the outer flap is engaged by the clamping member in locking position to retain same against opening.

6. The structure set forth in claim 4, wherein said connector means extending from said spring to said clamping member includes a substantially U-shaped stirrup having its closed lower portion extending below said spring in engagement therewith and its upstanding legs engaged with said clamping member to maintain said spring under compression for exerting a force from the spring to said clamping member to urge said clamping member to either a locking position or an open position.

7. The structure set forth in claim 4, including co-acting stop means on said base member and said connector means to limit the pivotal movement of said clamping member for limiting the amount of spring force applied to the outer of said flaps by said clamping member in the locking position whereby crushing of the outer flap is prevented even though the outer flap is engaged by the clamping member in locking position to retain same against opening, and additional co-acting stop means on said base member and said clamping member for limiting the pivotal movement of the clamping member for stopping same with said clamping member extending substantially vertically in said aligned openings in said flaps so that the outer flap may be moved away from the inner flap.

8. A fastener for boxes and the like having overlapping flaps with aligned openings therein, comprising a clamping member, a base member connected to the lower one of said flaps, means pivotally connecting said clamping member to said base member with said clamping member extending through said aligned openings in said overlapping flaps, a spring mounted on said base member, means connecting said spring with said clamping member for transmitting the spring force to said clamping member to urge same to a locked position in engagement with the upper one of said flaps to prevent the separation of said flaps until said clamping arm is moved out of contact with said upper one of said flaps, and said means connecting said spring with said clamping member being a stirrup pivotally connected to said clamping member and extending to said spring so that said stirrup swings with the clamping member for continuously applying said spring force to said clamping member.

9. A fastener for boxes and the like having overlapping flaps with aligned openings therein, comprising a clamping member, a base member connected to the lower one of said flaps, means pivotally connecting said clamping member to said base member with said clamping member extending through said aligned openings in said overlapping flaps, a spring mounted on said base member, means connecting said spring with said clamping member for transmitting the spring force to said clamping member to urge same to a locked position in engagement with the upper one of said flaps to prevent the separation of said flaps until said clamping arm is moved out of contact with said upper one of said flaps, and said means connecting said spring being a stirrup pivotally connected to said clamping member and extending to said spring so that said stirrup swings with the clamping member for continuously applying said spring force to clamping member, and means for limiting the movement of the stirrup at its lower end as said stirrup swings with said clamping member, whereby the upper end of the stirrup swings to each side of the pivotal point of the pivotal connection between said clamping member and said base member as said clamping member is pivoted to the locked and open positions so that in each of said positions a retaining force from the spring is exerted to maintain the clamping member in one of said positions until manually moved to the other of said positions.

10. A fastener for boxes and the like having overlapping flaps with aligned openings therein, comprising a clamping member, a base member connected to the lower one of said flaps, means pivotally connecting said clamping member to said base member with said clamping member extending through said aligned openings in said overlapping flaps, a spring mounted on said base member, means connecting said spring with said clamping member for transmitting the spring force to said clamping member to urge same to a locked position in engagement with the upper one of said flaps to prevent the separation of said flaps until said clamping arm is moved out of contact with said upper one of said flaps, said spring being a leaf-spring having a downwardly bowed section spaced from said base member, and said means connecting said spring with said clamping member being connected with said spring at said downwardly bowed portion, whereby said bowed portion of said spring flexes relative to the base member during the movement of the clamping member to its locked and open positions.

11. A box having at least one fastener connected thereto for releasably fastening adjacent flaps of the box in an overlapped position, each of said flaps having an opening which is aligned with an opening in the other of the flaps when said flaps are in the closed position, said fastener comprising, a base member connected to the inner one of said flaps, a clamping member extending through the opening in the inner flap and also through the opening in the outer one of said flaps when same is in the closed position, a pivotal connection means for connecting said clamping member to said base member for the pivoting of the clamping member from a locking position in engagement with the outer surface of the outer one of the flaps to an open position extending supstantially vertically in the aligned openings in the flaps, a spring mounted on said base member, means connecting said spring to said clamping member for applying a positive pressure to said clamping member in all positions thereof, said spring being a leaf-spring positioned below said base member, at least one shoulder formed on said leaf-spring, said means connecting said spring to said clamping member including a substantially U-shaped stirrup having its closed lower portion positioned below said spring and its upstanding legs connected to said clamping member, and one of said legs engaging said shoulder to limit the movement of the lower end of the stirrup during the pivoting of the clamping member.

12. A box having at least one fastener connected thereto for releasably fastening adjacent flaps of the box in an overlapped position, each of said flaps having an opening which is aligned with an opening in the other of the flaps when said flaps are in the closed position, said fastener comprising, a base member connected to the inner one of said flaps, a clamping member extending through the opening in the inner flap and also through the opening in the outer one of said flaps when same is in the closed position, a pivotal connection means for connecting said clamping member to said base member for pivoting of the clamping member from a locking position in engagement with the outer surface of the outer one of the flaps to an open position extending substantially vertically in the aligned openings in the flaps, a spring mounted on said base member, means connecting said spring to said clamping member for applying a positive pressure to said clamping member in all positions thereof, said means connecting said spring to said clamping member including a substantially U-shaped stirrup having its closed lower portion extending below said spring in engagement therewith and its upstanding legs engaged with said clamping member to maintain said spring under compression for exerting a force from the spring to said clamping member to urge said clamping member to either a locking position or an open position, said base member being formed in two base sections with notches formed therebetween and positioned in alignment with said openings in said flaps, and said legs of said stirrup extending through said notches for engagement with one wall of each of said notches to limit the pivotal movement of said clamping member when it is urged to the locking position to limit the amount of pressure exerted on the flaps by said clamping member in its locking position.

13. A fastener for fastening overlapping flaps releasably together, wherein at least one of such flaps has an opening formed therein, comprising a clamping member, a base member connected to one of said flaps, means pivotally connecting said clamping member to said base member with said clamping member extending through said opening in said one of the flaps, a spring mounted with said base member, and stirrup means extending from said spring to said clamping member for transmitting the spring force of said spring to said clamping member to urge same to a locked position in engagement with the flap having the opening therethrough to prevent the separation of the flaps until said clamping arm is moved out of contact with the flap having the opening therein.

14. A fastener for fastening overlapping flaps releasably together, wherein at least one of such flaps has an opening formed therein, comprising a clamping member, a base member connected to one of said flaps, means pivotally connecting said clamping member to said base member with said clamping member extending through said opening in said one of the flaps, a spring mounted with said base member and spaced from said clamping member, and stirrup means extending from said spring to said clamping member for transmitting the spring force of said spring to said clamping member to urge same to a locked position in engagement with the flap having the opening therethrough to prevent the separation of the flaps until said clamping arm is moved out of contact with the flap having the opening therein.

References Cited in the file of this patent

UNITED STATES PATENTS

| | | |
|---|---|---|
| 589,336 | Carlson | Aug. 31, 1897 |
| 885,879 | Smith | Apr. 28, 1908 |
| 1,366,611 | Trohon | Jan. 25, 1921 |
| 1,768,371 | Pilon | June 24, 1930 |